US006415706B1

(12) United States Patent
Pöschl et al.

(10) Patent No.: US 6,415,706 B1
(45) Date of Patent: Jul. 9, 2002

(54) ACTUATOR

(75) Inventors: Günter Pöschl, Schwaikheim; Kurt Stoll, Esslingen, both of (DE)

(73) Assignee: Festo AG & Co., Esslingen (DE)

( * ) Notice: Subject to any disclaimer, the term of this patent is extended or adjusted under 35 U.S.C. 154(b) by 0 days.

(21) Appl. No.: 09/155,919

(22) PCT Filed: Apr. 11, 1997

(86) PCT No.: PCT/EP97/01807

§ 371 (c)(1),
(2), (4) Date: Apr. 19, 1999

(87) PCT Pub. No.: WO97/39246

PCT Pub. Date: Oct. 23, 1997

(30) Foreign Application Priority Data

Apr. 12, 1996 (DE) ........................................ 196 14 505

(51) Int. Cl.[7] ................................ F16J 1/01; F16J 1/14

(52) U.S. Cl. .................. 92/169.2; 92/170.1; 92/165 R; 92/187; 92/248

(58) Field of Search ................................ 92/5 R, 169.2, 92/170.1, 165 R, 187, 248

(56) References Cited

U.S. PATENT DOCUMENTS

| | | | | |
|---|---|---|---|---|
| 872,786 A | * | 12/1907 | Beasell | 92/187 |
| 3,173,344 A | * | 3/1965 | Mongitore | 92/187 |
| 3,785,253 A | | 1/1974 | Sandau | 92/181 |
| 4,197,787 A | * | 4/1980 | Schneider | 92/170.1 |
| 4,523,514 A | * | 6/1985 | Burk | 92/5 R |
| 4,572,056 A | * | 2/1986 | Funke | 92/170.1 |
| 4,719,844 A | * | 1/1988 | Dugan | 92/170.1 |
| 4,777,844 A | * | 10/1988 | DeBell et al. | 92/222 |
| 4,796,517 A | | 1/1989 | Akao | 92/187 |
| 4,846,051 A | * | 7/1989 | Wade et al. | 92/170.1 |

FOREIGN PATENT DOCUMENTS

| | | | | |
|---|---|---|---|---|
| DE | 677877 | | 7/1939 | |
| DE | 1475578 | | 1/1970 | |
| DE | 3243939 | | 5/1984 | |
| DE | 3722437 | | 2/1988 | |
| DE | 4039173 | | 6/1992 | |
| DE | 4100854 | | 7/1992 | |
| EP | 933898 | * | 8/1963 | 92/169.2 |
| GB | 2204658 | | 11/1988 | |
| JP | 67411 | * | 3/1988 | 92/5 R |

OTHER PUBLICATIONS

Festo Company Brochure—"Norm–Zylinder In Festo Qualität" (English translation: Standard Cylinders of Festo Quality)—published May 1992—especially pp. 20 and 21.

K–H Hellmann o+p "Öl Hydraulik und pneumatik" (English translation: oil hydraulics and pneumatics) especially the page which precedes p. 723 and Fig. 6.

* cited by examiner

*Primary Examiner*—F. Daniel Lopez
(74) *Attorney, Agent, or Firm*—Volpe and Koenig P.C.

(57) ABSTRACT

The description relates to an actuator for use at high and low temperatures, with a cylinder block (8), a piston (14) movable therein and a piston rod (22) secured to the piston. A first and a second flange cover (46, 48) and a sleeve (40) in the cylinder block (8) in which the piston (14) can move to and fro are made of ceramic. The piston rod (22) is secured to the piston (14), also of ceramic, by a head bearing (24) movable transversely to the longitudinal axis of the piston. The seal between the piston (14) and the sleeve (40) is provided solely by a close fit, without the need for additional sealing components. The low thermal expansion of the ceramic components used also means that the tolerances change little even at great temperature fluctuations. The radial head bearing (24) prevents the piston (14) from jamming during forces transverse to the longitudinal axis of the piston possibly arising at the piston rod (22).

17 Claims, 1 Drawing Sheet

ACTUATOR

TECHNICAL FIELD

The invention relates to an actuator of the type described below.

PRIOR ART

Such an actuator or controller which takes the form of a working cylinder and particularly a pneumatic working cylinder (see, for example, company brochure Festo Pneumatic, 386.7/90522LD, May 1992) constitutes a structurally simple solution for producing back-and-forth movements. Pneumatic devices are generally of uncomplicated construction, and therefore easy to service, operationally safe, reliable (possible lack of airtightness rarely has effects which interfere with functioning) not subject to overloading (force limit is determined by pressure intensity), relatively insensitive, easily controllable (by throttles and pressure regulating valves) and economical due to low production and maintenance costs, despite the relatively high production costs for compressed air. They feature low operating weight and only few structural components. Nevertheless, until now the use of pneumatic actuators remained limited to moderate operating temperatures. In particular, until now sealing problems prevented application at very high or very low temperatures.

It is conventional in the prior art to make such actuators with cylinder walls and pistons of metal. The sealing between cylinder wall and piston is normally provided by a piston skirt or an O-ring (see the above-mentioned company brochure, pages 20 and 21). The actuators can be unidirectionally or bidirectionally functioning working cylinders in which the piston is moved back and forth inside the working cylinder by supplying the workspace defined by the cylinder wall, the piston and a cylinder lid with compressed air and then again decompressing it. To move the piston back into its initial position, the decompressing is generally not sufficient, rather the return movement is effectuated by a spring, or by supplying compressed air to the other side of the piston (two-way functioning actuator, see o+p "oil hydraulic and pneumatic" 31 (1987) no. 9, 718 to 724, especially 722).

To save on compressed air and to obtain in the workspace the high pressure required for high control forces it is necessary to minimize the leakage flows between the cylinder wall and the piston which is displaceable along the longitudinal axis of the cylinder. Indeed, by using special polymeric sealing materials (e.g. Teflon, Kalrez) good sealing effects can be achieved, yet the use of such polymers is normally limited to temperatures from about 50 to +200° C. One can also envision making the space between piston and cylinder wall very narrow and employing for both components an alloy with equal thermal expansion coefficients. However the relatively high thermal expansion coefficient of metals has the effect that, even with equal expansion coefficients of piston and cylinder, the gap between them becomes substantially wider at relatively elevated temperatures and the efficiency becomes correspondingly poorer. In addition at both very low and very high temperatures the components of which the actuator is constructed contract or expand unequally and thereby cause the piston and the cylinder, or the piston rod where it traverses the cylinder lid to jam so that the actuator becomes inoperative.

DESCRIPTION OF THE INVENTION

The subject of the invention is to so improve an actuator of the type described herein that trouble-free operation is assured even at very low and very high operating temperatures.

This object is accomplished in accordance with the invention by the characteristics set forth herein.

The invention, through the selection of material or materials with low thermal expansion for the cylinder housing, the piston and the head bearing between piston and piston rod makes it possible to provide a seal between piston and cylinder housing solely by means of a close fit without additional sealing elements. The low thermal coefficient of expansion of the materials employed insures that the leakage of an operating medium filling the working cylinder remains low even at very high temperatures. Conversely, at very low temperatures, seizing-up of the piston in the cylinder housing is prevented because the gap between cylinder housing and piston diminishes only slightly due to the temperature reduction. If the piston and the cylinder housing are made of ceramic material, the high hardness of this material assures that the gap between piston and cylinder housing does not widen even after prolonged operation. The head bearing which connects the piston rod and the piston and is moveable transversely to the piston's longitudinal axis assures that no bending forces can arise between piston rod and piston even at the required close tolerances.

If, in one embodiment of the invention, the piston rod of the actuator consists of material or materials with low thermal expansion, especially ceramics, high operating reliability of this component is provided, even at extremely low and high temperatures.

If, in a further embodiment of the invention, the head bearing consists of a round disc in which a ball joint cavity has been created, in which a ball-shaped end of the piston rod is engaged, then the ball-shaped end of the piston rod can be displaced transversely to the piston rod's longitudinal axis, which simultaneously makes it possible to transmit a strong force in the pushing direction. From DE-AS (German Patent Publication) 14 75 578 it is already known to make the end of the piston rod in a ball shape.

If, in a further embodiment of the invention, the ball-shaped end of the piston rod engages the ball joint cavity by means of a snap fit, then the radially moveable head bearing can be made inexpensively. Because, when pressure is exerted on the piston rod, the ball-shaped end of the piston rod and the ball joint cavity can have a large contact surface, strong forces can be transmitted in the pushing direction. The smaller contact surface provided by the snap fit during exposure of the piston rod to a pulling force is of lesser importance, because strong pulling forces do not occur during normal operation. Only when the actuator takes the form of a two-way functioning actuator, in which the compressed air is also supplied to the side of the piston at which the piston rod is attached, then the head bearing must also be capable of transmitting relatively strong pulling forces.

If, in a further embodiment of the invention, the round disc of the head bearing is subdivided along a transverse surface passing through the center of the ball joint cavity, then the ball joint cavity and the ball-shaped end of the piston rod can be made so that, even if the piston rod is subjected to a pull, the contact surface between the ball-shaped end of the piston rod and the ball joint cavity is great enough to transmit strong forces.

If, in a further embodiment of the invention, the piston is subdivided and is joined together after application of the head bearing by means of an external shrink-on collar, the round disc can simply be embedded in the piston and the two piston halves can be centered easily and with accurate fit.

If, in a further embodiment of the invention, the cylinder housing is subdivided into two, or more than two cylinder housing segments, which bear against each other at abutting locations and, at the one or more abutments, there is provided an additional external shrink-on collar, then the cylinder housing can be assembled from segments which are simple and inexpensive to manufacture. Especially if the cylinder housing is to be made of ceramic and if the actuator is to have a relatively long stroke, construction of the cylinder housing from several housing segments becomes economical.

If, in a further embodiment of the invention, the cylinder housing consists of a tube which is closed at its respective ends by a first or second flange cover, and the first and second flange covers are connected in pretensioned manner by tie rods, then the tube can be easily manufactured from a material (often difficult to shape) which has low thermal expansion. The construction of the cylinder housing from several simple components reduces the manufacturing costs, especially when ceramic is used.

If, in a further embodiment of the invention, the additional external shrink-on collar has holes paralleling the longitudinal axis of the working cylinder through which the tie rods or connectors of the tie rods can extend, then these are passed through those holes and it is also easy to provide, for example, an electrically conducting or electrically insulating mechanical connection between the tie rods or the connectors and the additional external shrink-on collar.

If, in a further embodiment of the invention, the cylinder housing and the piston consists of ceramic such as SiSiC, the thermal expansion of both components is very low and the tolerance between the two components is then only slightly dependent on temperature.

If, in a further embodiment of the invention, the two flange covers are made of the same or of different ceramic such as SiN or SiSiC, the thermal expansion of the flange covers is low and has an order of magnitude similar to that of the thermal expansion of a ceramic tube. In this way, one can prevent relative motion of a head end of the cylinder housing relative to a flange cover because, first, the absolute thermal expansion of both components in the radial direction is small, and secondly is approximately equally great. This makes sealing between the cylinder housing and the flange covers easier.

If, in a further embodiment of the invention, the piston rod consists of ceramic such as SiN, then it can be subjected to high mechanical loads.

If, in a further embodiment of the invention, the head bearing consists of graphite or of ceramic such as SiSiC or of metal-impregnated carbon ceramic, it can be subjected to heavy mechanical loads, it is self-lubricating, and it exhibits low friction.

If, in a further embodiment of the invention, the piston rod is passed into the cylinder housing through a bearing sleeve of metal-impregnated carbon ceramic, then this passage is in the form of a low-friction slide bearing which simultaneously provides a high sealing effect.

If, in a further embodiment of the invention, the cylinder housing consists of electrically conductive or semiconductive material and is provided with electrical connecting terminals for connection to an electrical voltage source, then the cylinder housing can be used as an electrical resistance heater for heating the actuator.

If, in a further embodiment of the invention, an additional electrical connecting terminal is provided at the free end of the piston rod, then it is possible to electrically ascertain the location of the piston inside the cylinder housing by measuring the electrical resistance between the electrical connecting terminals on the cylinder housing and the piston rod at various piston locations and determining a corresponding characteristic curve. Thereafter, the prevailing piston location can be read out through resistance measurement.

An illustrative example of the invention is described in more detail in what follows with reference to the drawing. There is shown in

BEST MODE OF PRACTICING THE INVENTION

Figure 1:
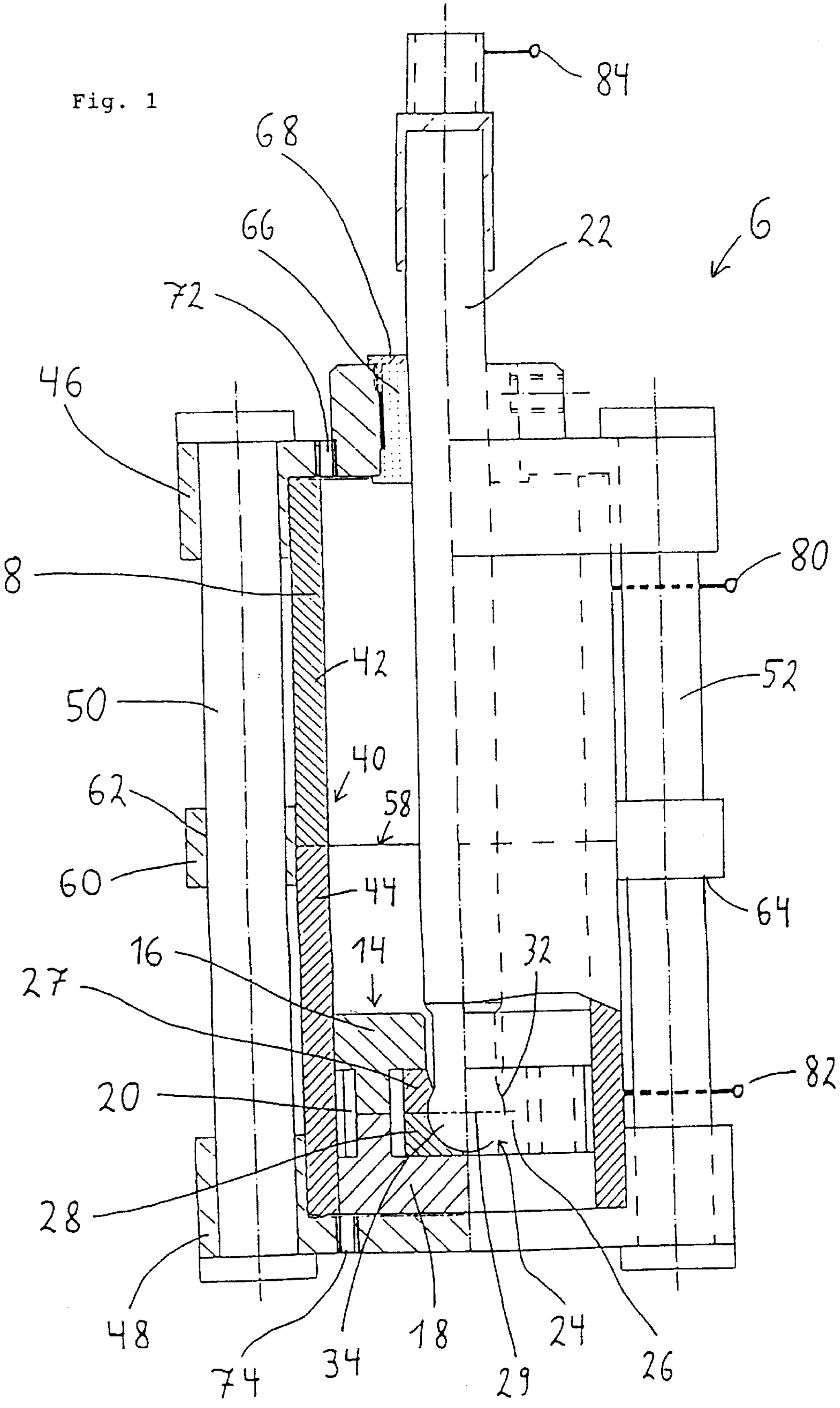
FIG. 1 an actuator according to the invention in partial longitudinal cross-sectional view.

According to FIG. 1 an actuator designated overall with 6 consists essentially of a cylinder housing 8, a piston 14 slidable therein and a piston rod 22 attached to piston 14 via a head bearing 24. Piston 14 is subdivided transversely to the piston's longitudinal axis into two piston portions 16, 18, both of which are made of SiSiC ceramic. Both piston portions 16, 18 are joined together at their circumference by an external shrink-on collar 20, for example of steel. In piston 14, there is embedded a round disc 26 made from carbon ceramic impregnated with a metal such as lithium, for example. However the round disc 26 can also consist of graphite or of SiSiC ceramic. Round disc 26 is subdivided into disc halves 27, 28 along a transverse surface 29, the two disc halves 27, 28 jointly forming the head bearing 24, which head bearing defines a hollow space in the shape of a ball joint cavity 32. A ball-shaped end of piston rod 22 engages ball joint cavity 32. The entire piston rod 22 is preferably made of SiN ceramic.

The cylinder housing 8 is a centrally subdivided tube 40, so that it consists of two cylinder housing segments or tube halves 42, 44. Of course, the cylinder housing can also be subdivided into more than two cylinder housing segments. It is closed by a first flange cover 46 and a second flange cover 48. The housing segments 42, 44 and the flange covers 46, 48 are made of SiSiC ceramic. However, the first flange cover 46 and/or the second flange cover 48 can also be made of SiN ceramic. At an abutment location 58 between the housing segments 42, 44 there is mounted an external shrink-on collar 60 of steel. Pretensioned tie rods 50, 52 join the first and the second flange cover 46, 48 to each other. The tie rods 50, 52 pass through holes 60, 64 in shrink-on collar 60.

A piston rod 22 passes through a sleeve bearing 66 of carbon ceramic impregnated with metal such as lithium, for example, which is fitted into the first flange cover 46. The sleeve bearing 66 is outwardly secured by a cover 68. Each of the first and the second flange covers 46, 48 has an operating medium coupling 72, 74. Here the operating medium is compressed air.

As illustrated, electrical connecting terminals 80, 82 are attached to cylinder housing segments 42, 44. An additional electrical connecting terminal 84 is provided at the free end of piston rod 22.

In operation, the piston 14 and the piston rod 22, which is firmly connected to the piston 14, can be moved back and forth in axial direction by applying operating medium pressure to couplings 74, 72, or releasing that pressure.

The location of the piston can be determined by a resistance measurement between the electrical connection 82 and the electrical connection 84, because this resistance increases as the piston 14 moves away from electrical connection 82. Through the electrical connections 80, 82, the actuator 6 can also be heated by application of an electrical voltage so that, for example, the piston 14 is prevented from freezing fast within cylinder housing 8. By using semiconductive materials as, for example, SiSiC ceramic for the cylinder housing 8, application of an electrical voltage to connections 80, 82 causes a current to flow in order to provide the desired heating effect.

To connect the two cylinder housing segments 42, 44 by means of collar 60, the latter is heated and then shrunk onto the abutment location 58 by cooling to the temperature of the housing segments 42, 44. In this way, precise centering of the housing segments 42, 44 is assured in a simple manner. Because the pretensioning of tie rods 50, 52 at the collar 60 and at the abutment location 58 causes only compressive forces to arise even in operation, heavy pretensioning of the shrink-on collar 60 is not necessary. The tie rods 50, 52 take the form of bolts, pretensioning being produced at one or both ends of each bolt by tightening a threaded connector (not shown) to a greater or lesser degree.

The two piston halves 16, 18 are joined in a manner analogous to the cylinder housing segments 42, 44. In normal operation the shrink-on connection 20 is entirely adequate because there do not arise strong pulling forces between the two piston halves 16, 18, but rather mainly compression forces from the piston half 18 are transmitted via disc half 28 directly to the piston rod 22. Before assembling piston 14 from the two piston halves 16, 18, the two disc halves 27, 28 are inserted between the two piston halves 16, 18. It is possible to slide the disc half 27 on from the side of the piston rod opposite the ball-shaped end 34 of the piston rod. In this way the ball-shaped end 34 of the piston rod can be easily mounted in the ball joint cavity 33 formed by the two disc halves 27, 28. Because the disc half 27 facing toward the piston rod 22 is conical at its outer head end, it is also possible to engage the ball-shaped end 34 of the piston rod by means of a snap fit into the ball joint cavity 32, after assembly of the disc halves 27, 28.

The operating medium couplings are illustrated in FIG. 1 as simple threaded borings 72, 74, but, in place of the threaded borings 72, 74, intake and outlet valves can also be used as operating medium couplings. If the actuator is operated at high temperature and uses for its operating medium a gas which is cooler relative to the actuator, then, after the intake valve is closed, the supplied gas can develop, solely by its heating effect, a mechanical force which can be transmitted to the piston rod 22.

What is claimed is:

1. Actuator (6) for use at high and low temperatures constructed as a working cylinder with cylinder housing (8), piston (14) slidable therein and piston rod (22) attached to piston (14), characterized in that the piston rod (22) is connected to piston (14) by means of a head bearing (24) having a cavity (32) in which a part of the piston rod (22) is engaged and said cavity and engaged piston rod being moveable tansversely and radially to the cylinder's longitudinal axis, in that at least the cylinder housing (8), the piston (14) and the head bearing (24) consists of material or materials having low thermal expansion, and in that the head bearing (24) consists of a round disc (26) in which the cavity (32) is formed, and in which a ball-shaped end (34) of the piston rod is engaged to form a ball joint.

2. Actuator according to claim 1, characterized in that the piston rod (22) consists of material or materials having low thermal expansion.

3. The actuator of claim 2 wherein the piston rod material is a ceramic.

4. Actuator according to claim 3, characterized in that the ball-shaped end (34) of the piston rod (22) is engaged in the ball joint cavity (32) by means of a snap fit.

5. Actuator according to claim 3, characterized in that the round disc (26) of the head bearing (24) is subdivided at a transverse surface (29) passing through the center of the ball joint cavity (32).

6. Actuator according to claim 1, characterized in that the piston (14) is subdivided and held together by means of an external shrink-on collar (20).

7. Actuator according to claim 6, characterized in that the cylinder housing (8) is subdivided into two, or more than two cylindrical housing segments (42, 44) which adjoin at abutting locations (58) and in that, at each abutting location (58), the cylinder housing segments are joined by means of an additional external shrink-on collar.

8. Actuator according to claim 1 characterized in that the cylinder housing (8) consists of a tube (40) which is closed at its ends by a first and second flange cover (46, 48), the first and second flange covers (46, 48) being joined by means of pretensioned tie rods (50, 52).

9. Actuator according to claim 8, characterized in that both flange covers (46, 48) consist of the same or of different SiN or SiSiC ceramics.

10. Actuator according to claim 1, characterized in that the cylinder housing (8) and the piston (14) consist of SiSiC.

11. Actuator according to claim 1 characterized in that the piston rod (22) is introduced into the cylinder housing (8) through a sleeve bearing (66) of metal-impregnated carbon ceramic.

12. Actuator according to claim 1, characterized in that the piston rod (22) consists of ceramic SiN.

13. Actuator according to claim 1, characterized in that the head bearing (24) consists of graphite or SiSiC ceramic or metal-impregnated carbon ceramic.

14. Actuator according to claim 1 characterized in that the cylinder housing (8) consists of electrically conductive or semiconductive material and is provided with electrical connecting terminals (80, 84) for connection to an electrical potential source.

15. Actuator according to claim 14, characterized by an additional electrical connecting terminal (84) at the free end of the piston rod.

16. Actuator (6) for use at high and low temperatures constructed as a working cylinder with cylinder housing (8), piston (14) slidable therein and piston rod (22) attached to piston (14), characterized in that the piston rod (22) is connected to piston (14) by means of a head bearing (24) moveable transversely to the cylinder's longitudinal axis and in that at least the cylinder housing (8), the piston (14) and the head bearing (24) consists of material or materials having low thermal expansion, in that the piston (14) is subdivided and held together by means of an external shrink-on collar (20), and in that the cylinder housing (8) is subdivided into two, or more than two cylindrical housing segments (42, 44) which adjoin at abutting locations (58) and in that, at each abutting location (58), the cylinder housing segments are joined by means of an additional external shrink-on collar.

17. Actuator according to claim 16, characterized in that the additional external shrink-on collar (60) has holes (62, 64) paralleling the longitudinal axis of the working cylinder, through which the tie rods (50, 52) or tie rod connectors extend.

* * * * *

UNITED STATES PATENT AND TRADEMARK OFFICE
CERTIFICATE OF CORRECTION

PATENT NO. : 6,415,706 B1
DATED : July 9, 2002
INVENTOR(S) : Pöschl et al.

It is certified that error appears in the above-identified patent and that said Letters Patent is hereby corrected as shown below:

Column 6,
Line 11, please replace claim 7 with the following claim:
-- The actuator (6) of claim 1 which is constructed as a pneumatic working cylinder. --

Signed and Sealed this

Twenty-third Day of March, 2004

JON W. DUDAS
*Acting Director of the United States Patent and Trademark Office*